US008544831B2

(12) United States Patent
Klein et al.

(10) Patent No.: US 8,544,831 B2
(45) Date of Patent: Oct. 1, 2013

(54) CLAMP AND METHOD FOR PRODUCING A CLAMP

(75) Inventors: Thomas Klein, Ottmarsheim (DE); Hans Roesch, Gemmrigheim (DE); Gerhard Kloepfer, Pleidelsheim (DE); Karl Philipp, Bietigheim-Bissingen (DE)

(73) Assignee: BESSEY Tool GmbH & Co. KG, Bietigheim-Bissingen (DE)

( * ) Notice: Subject to any disclaimer, the term of this patent is extended or adjusted under 35 U.S.C. 154(b) by 768 days.

(21) Appl. No.: 12/657,492

(22) Filed: Jan. 20, 2010

(65) Prior Publication Data

US 2010/0187739 A1 Jul. 29, 2010

Related U.S. Application Data

(63) Continuation of application No. PCT/EP2008/060267, filed on Aug. 5, 2008.

(30) Foreign Application Priority Data

Aug. 16, 2007 (DE) ........................ 10 2007 039 841

(51) Int. Cl.

*B25B 1/00* (2006.01)
*B25B 1/02* (2006.01)
*B25B 5/02* (2006.01)
*B23Q 3/02* (2006.01)

(52) U.S. Cl.

USPC .................. 269/165; 269/3; 269/6; 269/134; 269/143; 269/166

(58) Field of Classification Search

USPC ................ 269/3, 6, 134, 143, 147, 165, 166, 269/171, 97, 249

See application file for complete search history.

(56) References Cited

U.S. PATENT DOCUMENTS

| | | | | |
|---|---|---|---|---|
| 4,291,868 | A * | 9/1981 | Giles | 269/93 |
| 4,989,847 | A | 2/1991 | Chapman | |
| D488,044 | S * | 4/2004 | Varzino | D8/72 |
| 6,848,683 | B2 | 2/2005 | Foshag et al. | |
| 6,957,808 | B2 * | 10/2005 | Varzino et al. | 269/95 |
| 7,396,004 | B2 * | 7/2008 | Kern | 269/6 |

(Continued)

FOREIGN PATENT DOCUMENTS

| | | |
|---|---|---|
| DE | 28 44 838 | 4/1980 |
| DE | 31 28 023 | 2/1983 |

(Continued)

*Primary Examiner* — Lee D Wilson
*Assistant Examiner* — Seahee Yoon
(74) *Attorney, Agent, or Firm* — Lipsitz & McAllister, LLC

(57) ABSTRACT

A clamp is provided, having a slide rail, a fixed arm fastened to the slide rail and on which a first abutment surface for a workpiece is arranged, a sliding arm displaceable on the slide rail, and a housing arrangement, on which are held a first bearing device and a second bearing device, by means of which the housing arrangement is guided on the slide rail. The sliding arm is positioned between the first and second bearing devices. A second abutment surface for a workpiece is arranged on the housing arrangement and faces the first abutment surface. A force application device is held on the sliding arm and acts on a pressure piece held on the housing arrangement. The housing arrangement has a first housing part with a housing interior having an opening. The sliding arm is brought into the housing interior through the opening during production of the clamp.

58 Claims, 8 Drawing Sheets

(56) References Cited

U.S. PATENT DOCUMENTS

| | | | | |
|---|---|---|---|---|
| 2003/0102614 | A1 | 6/2003 | Foshag et al. | |
| 2003/0234479 | A1 | 12/2003 | Brass et al. | |
| 2005/0184439 | A1 * | 8/2005 | Janson et al. | 269/6 |
| 2007/0205547 | A1 * | 9/2007 | Siemann | 269/6 |
| 2009/0026337 | A1 * | 1/2009 | Roesch et al. | 248/316.4 |
| 2009/0026681 | A1 | 1/2009 | Kloepfer et al. | |

FOREIGN PATENT DOCUMENTS

| | | |
|---|---|---|
| DE | 295 12 934 | 3/1996 |
| DE | 10 2006 008 871 | 8/2007 |
| EP | 0 679 475 | 11/1995 |
| EP | 1 314 515 | 3/2003 |

* cited by examiner

CLAMP AND METHOD FOR PRODUCING A CLAMP

This application is a continuation of international application number PCT/EP2008/060267 filed on Aug. 5, 2008.

The present disclosure relates to the subject matter disclosed in international application number PCT/EP2008/060267 of Aug. 5, 2008 and German application number 10 2007 039 841.9 of Aug. 16, 2007, which are incorporated herein by reference in their entirety and for all purposes.

BACKGROUND OF THE INVENTION

The invention relates to a clamp comprising a slide rail, a fixed arm, which is fastened to the slide rail and on which a first abutment surface for a workpiece is arranged, a sliding arm, which is displaceable on the slide rail, a housing arrangement, on which are held a first bearing device and a second bearing device spaced from the first bearing device, by means of which the housing arrangement is displaceably guided on the slide rail, wherein the sliding arm is positioned between the first bearing device and the second bearing device, and wherein there is arranged on the housing arrangement a second abutment surface for a workpiece, the second abutment surface facing the first abutment surface, and a force application device, which is held on the sliding arm and which acts on a pressure piece, which is held on the housing arrangement.

The invention also relates to a method for producing a clamp.

An arm clamp with a guide rail, on which a stationary transverse arm is seated, with a sliding arm, which is displaceable on the guide rail and can be tilted with this, and with a pressure application spindle with a pressure piece, which is displaceably arranged on the sliding arm, so that a pressure force can be exerted on a workpiece between the cross arm and the sliding arm, is known from EP 1 314 515 A2. A box-shaped attachment element for the sliding arm is provided, which provides a substantially plane abutment surface for a workpiece and which is configured in such a way that it can be slid onto the pressure piece of the sliding arm in order to hold the attachment element on the sliding arm and a pressure force can be exerted on a workpiece through the attachment element by means of a pressure application spindle. The attachment element has at least two spaced guide recesses, by means of which it is displaceably disposed on the guide rail.

The non-prior published document DE 10 2006 008 871 B3 discloses a workpiece pressure application device for a clamp tool.

The document DE 31 28 023 A1 discloses a screw clamp with a slide rail that clamps in an extended area.

The document DE 28 44 838 A1 discloses a screw clamp with a slide rail that has a fixed arm.

A clamp of the abovementioned type is also referred to as a body clamp. The housing arrangement is held on the sliding arm by means of the pressure piece. The sliding arm can be tilted with the slide rail. It can then exert a pressure force on a workpiece by means of the housing arrangement with the second abutment surface, so that one or more workpieces can be clamped between the first abutment surface and the second abutment surface.

SUMMARY OF THE INVENTION

In accordance with the invention, a clamp is provided, which can be produced in a simple manner.

In accordance with an embodiment of the invention, the housing arrangement has a first housing part with a housing interior having an opening, which faces the first abutment surface and by means of which the sliding arm can be brought into the housing interior during production of the clamp, and a second housing part is fastened to the housing arrangement to close the opening.

The clamp according to the invention can be produced in a simple and inexpensive manner because it can be assembled in a simple and inexpensive manner. The sliding arm can be inserted into the open first housing part from the front (on the side facing the first abutment surface). The housing interior is closed by the second housing part and an element is provided, on which the second abutment surface is configured or on which this can be positioned.

It is favourable if the second housing part is configured as a housing cover. As a result of this, the housing interior can be closed in a simple manner.

In particular, the second housing part is locked on the housing arrangement and is advantageously locked to the first housing part. As a result, the clamp can be produced in a simple manner. Few manual actions are sufficient to position the housing arrangement with its entire "internal workings" on the slide rail.

In particular, the second housing part is fastened at least partially to the first housing part. As a result of this, the clamp according to the invention can be assembled in a simple manner.

It is favourable if an abutment element, on which the second abutment surface is formed, is held at least partially on the second housing part. As a result of this, the clamp can be assembled in a simple manner. The housing arrangement can be mounted on the slide rail and closed, and the abutment element with the second abutment surface can then be slid onto the housing arrangement, for example.

It is especially advantageous if the first housing part and/or the second housing part are made from a plastic material. As a result, the clamp can be configured with a relatively low weight. Moreover, the production is simplified. For example, injection mouldings can be used that are configured such that only a low number of further parts need to be fastened.

It is favourable if the first housing part has a structure, which is L-shaped in cross-section, with a longitudinal region, which extends along the slide rail, and with a transverse region, which extends transversely to the slide rail. This enables a displaceability of the sliding arm to be provided in the longitudinal region between the first bearing device and the second bearing device. A fastening region for the pressure piece is provided by means of the transverse region. As a result, a clamping force can be exerted on the workpiece between the first abutment surface and the second abutment surface by means of the sliding arm with the force application device and by way of the pressure piece via the housing arrangement.

In particular, the first bearing device and the second bearing device can be arranged on the longitudinal region. The slide rail is guided through the longitudinal region.

In addition, the pressure piece is arranged on the transverse region in particular. As a result, it can be positioned at a spacing from the slide rail, so that a pressure force can be exerted by means of the force application device on the sliding arm and the sliding arm can thus tilt relative to the slide rail.

It is especially advantageous if a holding element is arranged in the housing interior to hold the first bearing device, the second bearing device and the pressure piece. By using such a holding element a stable configuration of the clamp is provided, so that this functions reliably. Moreover, the production of the clamp can be structured simply, since as a result of the holding element a preassembly is possible and/or individual components can be secured in their position without expensive fastening operations being necessary.

It is favourable if the holding element holds rollers of the first bearing device and the second bearing device. The slide rail is displaceably guided on these rollers. In particular, the slide rail is displaceably guided by sliding, wherein it is possible that one or more rollers are rotatable, so that the displacement guide means is a roller slide bearing arrangement here.

It is favourable if the holding element has pairs of recesses respectively with a first recess and an opposing second recess, in which a pin is respectively seated. This allows bearing components to be fastened on the holding element in a simple manner. The pin itself forms a roller or it is a support for a roller.

It is additionally favourable if the second housing part has opposing tongues with recesses, into which pins of the second bearing device are at least partially inserted. As a result, the second housing part can be held securely on the housing arrangement in order to close the opening.

The holding element is advantageously made from a metal material. It then has the necessary stability and can be produced in a simple manner.

For example, the holding element comprises a first limb, a parallel spaced second limb and on a face at least one connecting web between the first limb and the second limb. As a result of such a holding element an interstice is provided between the first limb and the second limb, which can receive rollers of the first bearing device and the second bearing device and through which the slide rail is directed. Moreover, such a holding element can be inserted into the housing interior by means of the sliding arm. In addition, elements can be preassembled on the holding element.

In particular, the first limb and the second limb are respectively L-shaped and adapted to the structure of the housing arrangement.

It is favourable if the at least one connecting web is positioned in the region of the opening of the first housing part. If a workpiece is clamped in place, a high force then acts in this region that can be absorbed by the at least one connecting web.

It is additionally favourable if the holding element has an open face, which lies opposite the face with the at least one connecting web. The holding element can be slid onto the roller holding element with the open face. This allows the clamp according to the invention to be simply produced.

It is especially advantageous if a roller holding element is arranged in the housing interior to hold rollers of the first bearing device. The roller holding element serves as an assembly aid during production of the clamp. The rollers can be inserted into the roller holding element and positioned correctly in the housing arrangement by means of the roller holding element. The sliding arm can be inserted during assembly of the clamp and then the holding element can be inserted. As a result, the first bearing device can be produced and positioned in the housing interior in a simple manner.

In particular, the roller holding element is arranged in the region of a first face of the first housing part remote from the fixed arm. The roller holding element preferably touches the corresponding face wall. This results in a simple positioning of the rollers.

It is then favourable if a holding element for the first bearing device and the second bearing device is slid with an open end onto the roller holding element. As a result of this, the holding element can be oriented relative to the rollers in a simple manner, so that these can be fastened to the holding element by means of pins, for example. Moreover, the roller holding element can then serve as a positioning aid acting as a spacer in the housing interior for the holding element. If the holding element is inserted into the housing interior and slid onto the roller holding element, then it has automatically reached its correct position in the housing interior.

It is favourable if the first housing part comprises recesses, into which pins of the first bearing device are at least partially inserted. Rollers can be fastened on the housing arrangement in a simple manner as a result of this. The pins can be directed through from the outside during the production of the clamp to enable a simple production. In addition, the first bearing device is securely held on the housing arrangement.

It is especially advantageous if the first abutment surface and the second abutment surface are aligned substantially parallel to one another. As a result, one or more workpieces can be clamped in place between the first abutment surface and the second abutment surface, wherein the clamping force acts substantially perpendicularly to the first abutment surface and the second abutment surface.

In particular in this case, the first abutment surface and the second abutment surface are oriented substantially perpendicularly to a longitudinal direction of the slide rail. This results in extensive possible uses for the clamp according to the invention.

In particular, the slide rail is guided through the first abutment surface and the second abutment surface (or an extension of these in alignment therewith). As a result of this, the first abutment surface and the second abutment surface have a closed abutment region, which extends (at least) as far as the slide rail.

It is favourable if the housing interior is closed at a face located opposite the second abutment surface except for a recess, through which the slide rail is passed. The housing interior is thus protected from contaminations and the like.

For the same reason it is favourable if the housing interior is closed on an underside and/or an upper side of the housing arrangement.

It is additionally favourable for the same reason if the housing interior is laterally closed.

It can be provided that the fixed arm is arranged to be fixably displaceable on the slide rail. Its position on the slide rail can be adjusted, wherein each corresponding position is a fixed position.

It is advantageous for the production of the clamp if the pressure piece comprises a holding head locating space for a holding head of the force application device and at least one locking element for fastening the holding head in the holding head locating space, wherein the at least one locking element is arranged in a locking element locating space and must be passed through by the holding head, wherein the at least one locking element and the locking element locating space are configured such that the expenditure of force to pass through the at least one locking element in an insertion direction of the holding head into the holding head locating space is lower than the expenditure of force to pass through in a removal direction of the holding head from the holding head locating space. Such a workpiece pressure application means is described in DE 10 2006 008 871 B3 that is not prior published, to which reference is expressly made. As a result of this, the clamp can be produced in a simple manner, since the pressure piece can be fastened to the housing arrangement (for example, a holding element) and can then be easily inserted during production of the holding head, which is seated on the force application device. Moreover, the pressure piece can then be fastened firmly and securely to the force application device.

In accordance with the invention, a clamp is provided, which has variable possibilities of use.

In accordance with an embodiment of the invention, the fixed arm has at least one blocking element, which in a locking position blocks the movement of the fixed arm relative to the slide rail at least in one direction, and an actuation device is provided, by means of which the inclination of the at least one blocking element is variable such that the fixed arm is displaceable on the slide rail for adjustment of its position on the slide rail.

With the solution according to the invention a fixed arm is provided, which is fixably displaceable on the slide rail. The fixed arm is fastened to the slide rail by means of the at least one blocking element (brake element).

This fixed position can be released by operation of the actuation device. The fastening is released by changing the inclined position of the at least one blocking element and the fixed arm can be brought into a position on the slide rail desired by the operator. An operator can thus determine the position of the fixed arm on the slide rail him/herself in a simple manner.

In particular, the operator does not need any tools to adjust the position. The fixed arm does not have to be released by releasing screws or the like, instead an adjustable arrangement can be achieved in a simple manner by releasing the blocking position (locking position) of the at least one blocking element.

The at least one blocking element is a plate (preferably a metal plate) with a recess, through which the slide rail is guided. As a result of this, tilting on the slide rail can be achieved in a simple manner by means of the at least one blocking element, and this blocks the displaceability of the fixed arm.

It is especially advantageous if a first blocking element is provided, which in a first locking position blocks the displaceability of the fixed arm on the slide rail in a first direction, and a second blocking element is provided, which in a second locking position blocks the displaceability of the fixed arm on the slide rail in a second direction, which is the contrary direction to the first direction. This allows a secure fastening of the fixed arm on the slide rail in relation to all directions in which forces act.

In particular, an angular position of the first blocking element in the first locking position is opposed to an angular position of the second blocking element in the second locking position, i.e. the corresponding angles have opposed signs. In this case, the angle is preferably measured working from a pivot axis relative to a longitudinal direction of the slide rail. It two blocking elements are provided, then it is possible that pivot axes of the first blocking element and the second blocking element lie on the same side in relation to the slide rail or on different sides in relation to the slide rail. In the first case, if the pivot axes lie on the same side of the slide rail, then the first blocking element and the second blocking element are preferably oriented in a mirror-inverted manner to one another, i.e. in the locking position they have the same angles in value with different signs relative to the longitudinal direction of the slide rail. If the pivot axes lie on different sides of the slide rail, then the first blocking element and the second blocking element are preferably aligned parallel to one another in the respective locking position. The respective pivot axes are preferably arranged point-symmetrically to a mirror axis. Here, the angles are also equal in value and have different signs, if the angles are measured from the pivot axis.

It is especially advantageous if the at least one blocking element is spring-loaded, wherein the spring force presses the at least one blocking element into its locking position. If the actuation device is not acting, the at least one blocking element is blocked in its locking position. The locking position can be released by an action of force against the spring force.

It is structurally advantageous if the at least one blocking element is arranged to be able to pivot relative to the slide rail on the fixed arm.

As a result of this, the locking position can be reached in a simple manner, for example, by a spring pressing the at least one blocking element into the corresponding inclined position (tilted position). This locking position can be released in a simple manner by pivoting in the opposite direction.

It is especially advantageous if the actuation device has a pressure element, which is linearly displaceable on the fixed arm. By means of this pressure element the at least one blocking element can be acted on by corresponding displacement. In particular, by action of the pressure element the at least one blocking element is pivoted out of a locking position, so that the displaceability of the fixed arm on the slide rail is released.

It is especially advantageous if a pivoting movement of the at least one blocking element can be actuated by the pressure element in order to release a locking position in a simple manner.

It is favourable if the pressure element is spring-loaded, wherein for the pressure element to act on the at least one blocking element a force must be exerted against the spring force. In a normal position the pressure element does not act on the at least one blocking element. The spring force positions the pressure element in this normal position. If a force is exerted on the pressure element, then the spring force must be overcome to be able to act on the at least one blocking element. As a result, the fixed arm can be “operated” in a simple manner to change its position on the slide rail.

In particular, the pressure element can be actuated from an upper side or underside of the fixed arm. This results in a simple structural configuration and operability. In particular, abutment surfaces of the fixed arm are kept free.

In accordance with the invention, a clamp is provided, which can be used in a simple and secure manner.

In accordance with an embodiment of the invention, at least one slide rail abutment element is seated on the slide rail and has at least one abutment surface, which is oriented transversely to the first abutment surface and transversely to the second abutment surface.

By means of such an abutment surface of the slide rail abutment element (“covering surface”), which is provided by a slide rail abutment element, the clamp can be placed on a workpiece on an upper surface of the workpiece.

A slide rail abutment element also has a surface on an upper end. This surface enables the clamp to also be placed on a support, so that this surface is also an abutment surface (“placement surface”). If the housing arrangement does not project beyond this placement end, then the housing arrangement can be displaced with the sliding arm when the clamp is set in place.

Moreover, the clamp can be fastened to a support such as a bench by means of the at least one slide rail abutment element. If the corresponding abutment element has an opening, it can be fastened to a bench-like support with a pin (bolt) bracket such as bench bracket TK6, for example, of BESSEY Tool GmbH & Co. KG, and the clamp itself can also be fastened with this.

In addition, the workpiece is protected against contact with the slide rail.

It is favourable if the at least one slide rail abutment element is detachably held on the slide rail. As a result, it can be positioned on the slide rail and, if necessary, also removed therefrom in a simple manner.

It is favourable if the at least one slide rail abutment element is clipped onto the slide rail. This enables it to be attached and also removed again in a simple manner.

It is additionally favourable if the at least one slide rail abutment element is displaceable on the slide rail. This enables it to be positioned in a simple manner. For example, it is provided that the at least one slide rail abutment element is held by frictional engagement on the slide rail in relation to a direction parallel to the longitudinal direction of said slide rail. If a correspondingly high force expenditure is used to overcome the friction force, the slide rail abutment element can be positioned.

It is favourable if the at least one slide rail abutment element is made from a plastic material and is preferably configured in one piece. This results in an inexpensive fabrication and simple operability. Moreover, an optimised workpiece protection is provided.

It is additionally favourable if the at least one slide rail abutment element has an abutment region, a first limb and a second limb. An abutment surface is configured on the abutment region. The slide rail can be brought between the first limb and the second limb to enable the at least one slide rail abutment element to be fastened to the slide rail. A further abutment surface can be configured at ends of the limbs.

Advantageously, a recess adapted to the slide rail is configured on the first limb and/or on the second limb. The slide rail can be inserted into this recess and a positive-locking arrangement can thus be achieved, by means of which the at least one slide rail abutment element can be securely fastened against detachment on the slide rail.

It is favourable if the first limb and the second limb are elastic in configuration and/or are held resiliently on the abutment region. As a result of this, the at least one slide rail abutment element can be placed on the slide rail by spreading the first limb and the second limb and can be fixed to this by frictional engagement relative to a longitudinal direction of the slide rail and, for example, also in a positive-locking arrangement transversely to this longitudinal direction.

An abutment surface advantageously lies below the slide rail on a side, on which the force application device is positioned. It lies on the side, on which the first abutment surface and the second abutment surface also lie. As a result of this, a workpiece can be protected from contact with the slide rail.

In particular, the at least one abutment surface has a larger width than the slide rail. For example, the at least one abutment surface has a width corresponding to the first abutment surface of the fixed arm and/or the second abutment surface of the housing arrangement. This makes tilting of the clamp difficult when this is attached.

It is additionally favourable if the at least one slide rail abutment element does not project beyond the fixed arm at an end opposite an abutment surface for a workpiece (that is seated between the first abutment surface and the second abutment surface). As a result, the clamp can be mounted at the appropriate location by means of the fixed arm.

It is additionally favourable if the at least one slide rail abutment element projects beyond the housing arrangement at an end opposite an abutment surface for a workpiece. As a result of this, the housing arrangement is set back in relation to this end. When the clamp is mounted, the slightly set-back housing arrangement can be displaced on the slide rail. A typical dimension for the projection amounts to 1 mm or less.

It is favourable if the at least one slide rail abutment element is arranged between the housing arrangement and the fixed arm to thus protect one or more workpieces lying between the first abutment surface and the second abutment surface from contact with the slide rail.

In accordance with the invention, a simple method for producing a clamp is provided.

In accordance with an embodiment of the invention for producing a clamp, the sliding arm is inserted into the first housing part from the opening during production of the clamp.

Because of the opening there is optimised access to the housing interior and the sliding arm can be positioned in the housing interior in a simple manner.

It is additionally favourable if after insertion of the sliding arm, a holding element is inserted into the first housing part. The holding element serves to hold the first bearing device, the second bearing device and the pressure piece. In this case, a preassembly can be performed, for example, by preassembling the second bearing device on the holding element and fastening the pressure piece on the holding element.

In particular, the second housing part is then placed on the first housing part after insertion of the holding element and the opening is thus closed.

For example, rollers of the second bearing device are fastened to the holding element before or after insertion of the holding element.

It is especially advantageous if a roller holding element, which holds rollers of the first bearing device, is inserted into the first housing part before insertion of the sliding arm. This roller holding element serves an aid in the assembly of the clamp. It ensures that rollers of the first bearing device are positioned in correct alignment in the housing interior.

It is then additionally favourable if the rollers of the first bearing device are held on the first housing part and/or a holding element by means of pins, which are inserted from an outer side of the housing arrangement. The expenditure for production and fixture as well as assembly of the first bearing device on the housing arrangement is minimised as a result of this.

The following description of preferred embodiments serves to explain the invention in more detail in association with the drawings.

BRIEF DESCRIPTION OF THE DRAWINGS

FIG. 3 is an exploded representation of a housing arrangement of

DETAILED DESCRIPTION OF THE INVENTION

Figure 1:
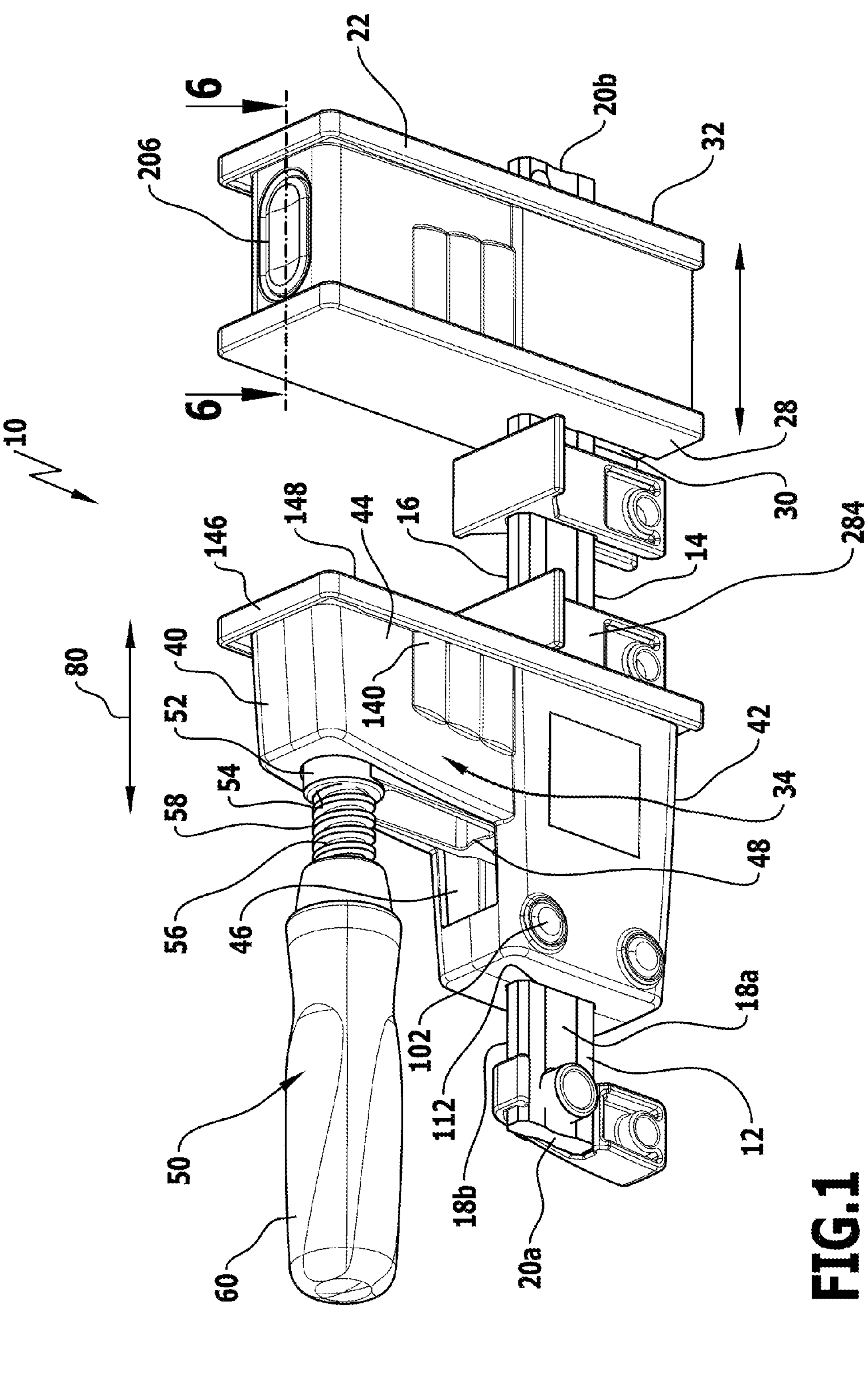
FIG. 1 is a perspective representation of a first exemplary embodiment of a clamp according to the invention.
Figure 2:
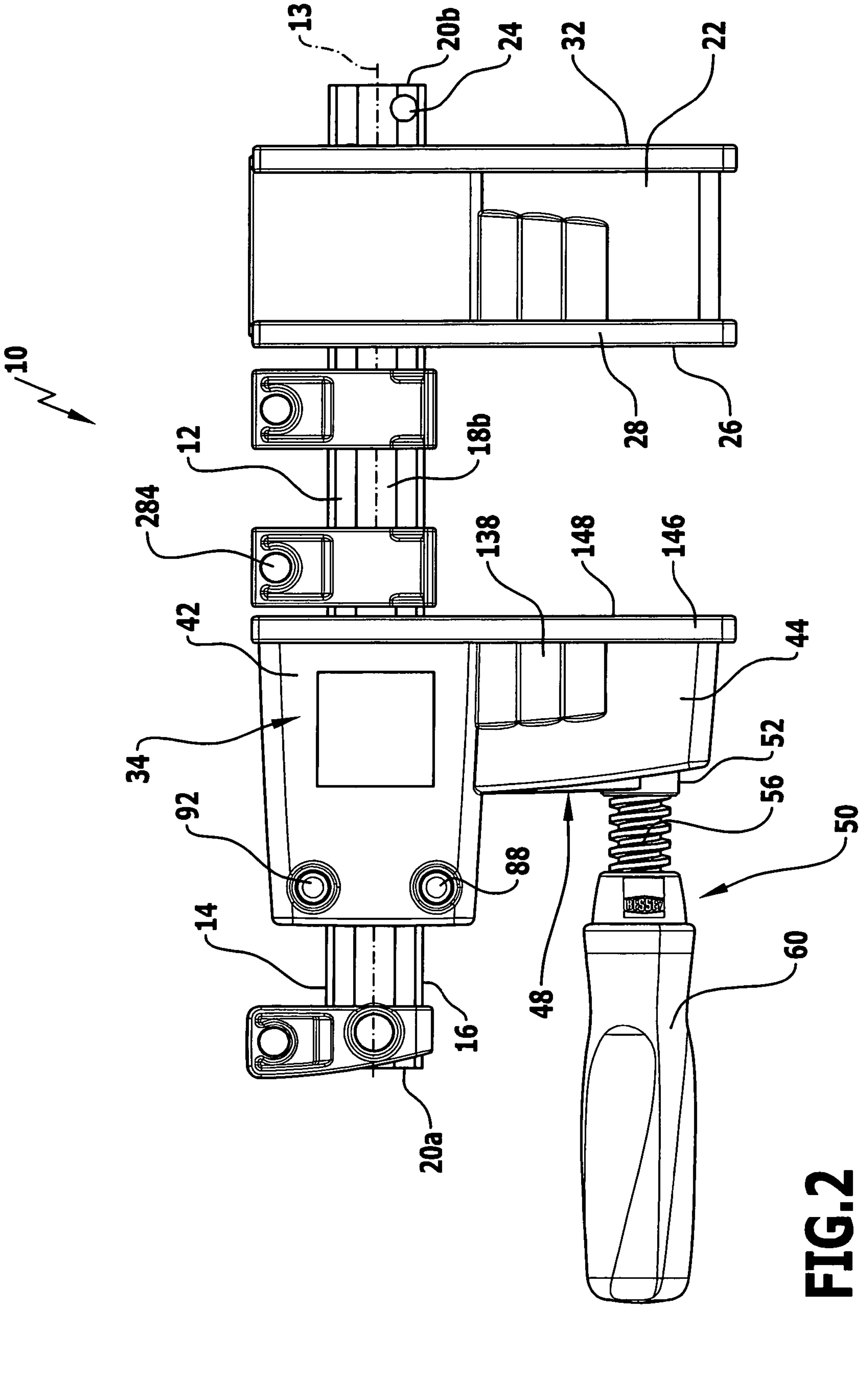
FIG. 2 is a side view of the clamp according to FIG. 1.

A first exemplary embodiment of a clamp according to the invention, which is shown in FIGS. 1 and 2 and given the reference 10 there, comprises a slide rail 12. The slide rail 12 is made from a metal material. It extends in a longitudinal direction 13. It has an upper side 14 and an underside 16. The upper side 14 and/or the underside 16 can be grooved in this case. Moreover, the slide rail 12 has opposing side faces 18*a*, 18*b*.

The slide rail 12 is contoured. An envelope in cross-section is substantially rectangular.

The slide rail 12 has a first end 20*a* and an opposing second end 20*b*.

A fixed arm 22 is arranged on or in the vicinity of the second end 20*b*. In this case, the fixed arm 22 can be fixably displaceable on the slide rail 12, i.e. its position can be adjustable relative to the longitudinal direction 13, or the fixed arm 22 can be fastened to the slide rail 12 to be unchangeably fixed. In the case where the fixed arm 22 is fixably displaceable on the slide rail 12, it can be provided that a pin-like raised section 24, for example, is arranged on or in the vicinity of the second end 20*b* of the slide rail 12, by means of which raised section the fixed arm 22 can be prevented from being removed from the slide rail 12 in the direction of the second end 20*b*.

The fixed arm 22 has a first abutment surface 26 for a workpiece. This first abutment surface 26 is substantially planar and extends substantially perpendicularly to the longitudinal direction 13 of the slide rail 12. In this case, the first abutment surface 26 points from a side, which extends beyond the underside 16, to a side, which extends beyond the upper side 14, i.e. the first abutment surface 26 extends beyond the slide rail 12.

Formed on a corresponding abutment element 28, on which the first abutment surface 26 is configured, is a recess 30, through which the slide rail 12 is passed to be able to fasten the fixed arm 22 on the slide rail 12.

It can be provided that the fixed arm 22 has a further abutment surface 32, which is directed away from the first abutment surface 26. This further abutment surface 32 is also preferably plane and in particular parallel to its first abutment surface 26.

Embodiments of fixed arms 22 are described in more detail below.

The clamp 10 is configured in particular as a body clamp. It comprises a housing arrangement 34 (body), through which the slide rail 12 is passed and which is guided on the slide rail 12 to be displaceable by sliding.

For this, a first bearing device 36 for the sliding and displaceable mounting on the slide rail 12 and a second bearing device 38 are arranged on the housing arrangement 34. The first bearing device 36 and the second bearing device 38 are spaced from one another in the longitudinal direction 13.

Figure 3:
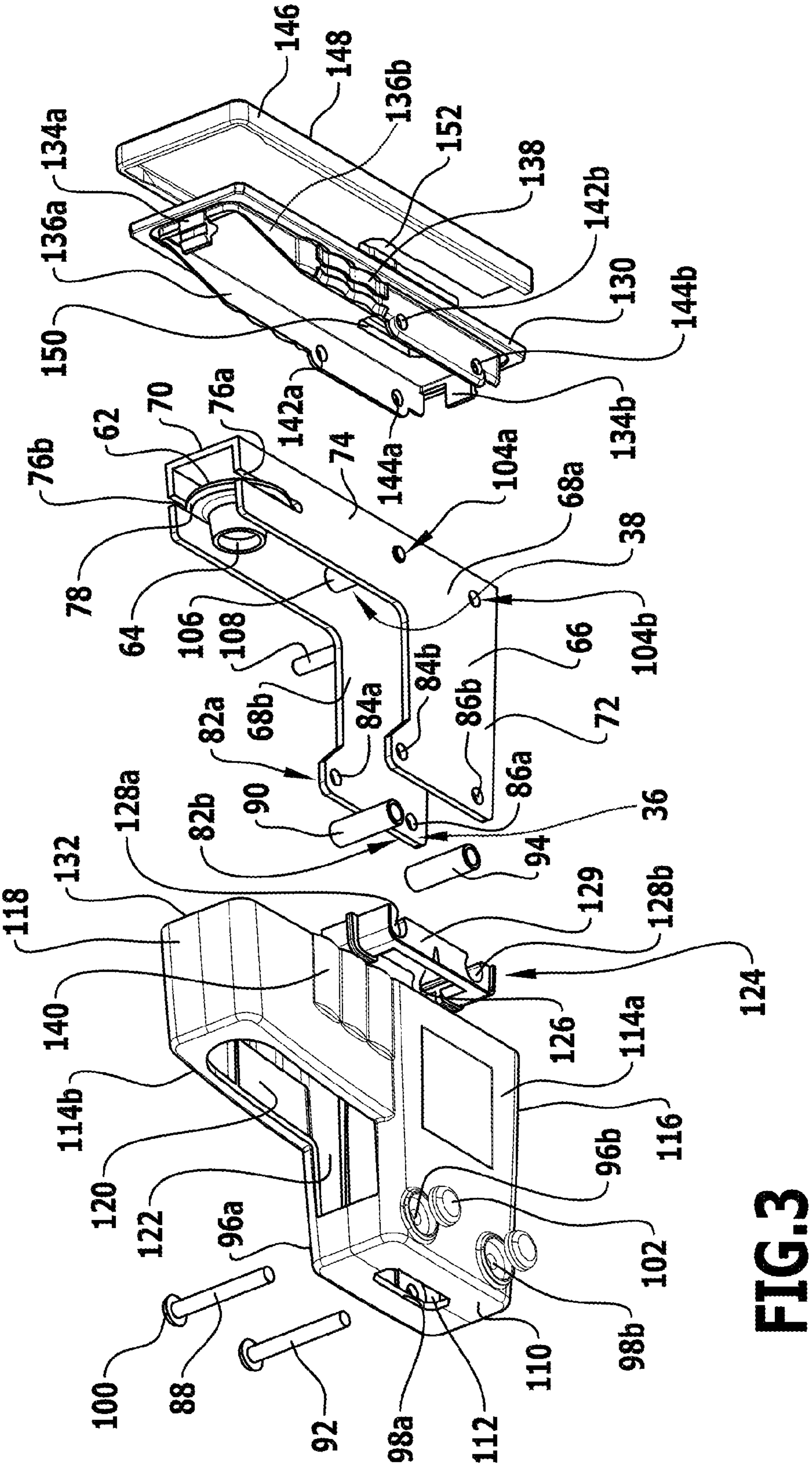

The detailed configuration of the first bearing device 36 and the second bearing device 38 is explained in more detail below in association with the exploded representation according to FIG. 3.

The housing arrangement 34 has a first housing part 40, which has a longitudinal region 42, which extends in the longitudinal direction 13, and a transverse region 44, which extends transversely to the longitudinal direction 13 and in particular perpendicularly to this. The first housing part 40 is preferably made from a plastic material and is configured in one piece or, for example, in two pieces with two housing shells.

The first bearing device 36 and the second bearing device 38 are arranged on the longitudinal region 42. The slide rail 12 accordingly passes through the longitudinal region 42.

The housing arrangement 34 has a housing interior 46, which is defined in particular by the first housing part 40.

Arranged in the housing interior 46 is a sliding arm 48, which is positioned between the first bearing device 36 and the second bearing device 38. The sliding arm 48 is displaceably guided on the slide rail 12. For this, it has a recess, through which the slide rail 12 is passed. The slide rail 48 extends in a transverse direction to the longitudinal direction 13.

A force application device 50 is held on the sliding arm 48. For this, a hollow cylindrical element 52, which has an internal thread 54, is arranged on the sliding arm 48, which is made in particular from a metal material. The hollow cylindrical element 52 is formed in particular in one piece on the sliding arm 48. It is spaced from the slide rail 12. A spindle 56 with an external thread is arranged in the internal thread 54 of the hollow cylindrical element 52. A handle 60, by means of which a rotational movement of the spindle 56 can be actuated in the hollow cylindrical element 52, is seated on the spindle 56.

On its end remote from the handle 60, the spindle 56 has a holding head (not shown in the drawings), on which a pressure piece 62 is held. A force can be exerted onto the housing arrangement 34 by the force application device 50 by means of the pressure piece 62.

The pressure piece 62 has a holding head locating space 64. The holding head, which is spherical, for example, of the spindle 56 is inserted into this.

It is possible that the pressure piece is configured as a workpiece pressure application means, as described in DE 10 2006 008 871 B3, which is not prior published. Accordingly, at least one locking element is arranged on the pressure piece 62 to fasten the holding head in the holding head locating space 64. This locking element is positioned in a locking element locating space and must be penetrated by the holding head. The at least one locking element and the locking element locating space are configured in such a way that the force expenditure to pass the at least one locking element in a direction of insertion of the holding head into the holding head locating space is lower than the force expenditure to pass through in a direction of removal of the holding head from the holding head locating space. This simplifies the production of the clamp 10, as will be described in more detail below.

The sliding arm 48 can be tilted on the slide rail 12. It enables a force to be exerted on the housing arrangement 34 by means of the pressure piece 62 in order to generate a clamping force. A corresponding clamping position is assured because of the tilting ability of the sliding arm 48.

The housing arrangement 34 serves to receive the sliding arm 48 and for force application.

A holding element 66 (FIG. 3), which serves to hold the first bearing device 36, the second bearing device 38 and the pressure piece 62, is arranged in the housing interior 46. For this, the holding element 66 comprises a first limb 68*a* and a second limb 68*b* spaced parallel thereto.

The first limb 68*a* and the second limb 68*b* have an L-shaped structure, wherein the two limbs 68*a* and 68*b* are configured to be basically the same.

The two limbs 68*a* and 68*b* are connected to one another at a face end by a connecting web 70. In this case, the holding element 66 is configured in particular in one piece and is preferably made from a metal material. Because of the connection with the connecting web 70, the holding element 66 has a U-shaped structure viewed from the top downwards. (Because of the L-shaped configuration of the first limb 68*a* and the second limb 68*b*, it has an L-shaped structure viewed from the side.)

Adapted to the first housing 40, the holding element 66 has a longitudinal region 72 and a transverse region 74, wherein the transverse region 74 is oriented transversely to the longitudinal region 72 and transversely to the longitudinal direction 13 of the slide rail 12.

In the transverse region 74, the holding element 66 has opposing slots, into which the pressure piece 62 is inserted with a pressure plate 78. As a result of this, the pressure plate 78 is blocked in its movement relative to the housing arrangement 34 on the slide rail 12 relative to a displacement direction 80 of the housing arrangement 34. (In this case, the displacement direction 80 comprises an advancing direction of the housing arrangement 34 towards the fixed arm 22 and a returning direction of the housing arrangement 34 away from the fixed arm 22.)

The slots 76*a*, 76*b* are preferably upwardly open in this case, so that the pressure piece 62 can be inserted with its pressure plate 78 from above in a simple manner.

The holding element 66 is open at its further face end, which lies opposite the connecting web 70, so that it can be slid over the sliding arm 48 during production of the clamp 10.

For formation of the first bearing device 36, recess pairs 82*a*, 82*b* are arranged on the transverse region 74 of the holding element 66 in the region of the face end, which is remote from the connecting web 70. In this case, a recess pair 82*a*, 82*b* respectively comprises a recess 84*a*, 84*b* or 86*a*, 86*b*. These recesses 84*a*, 84*b* are configured in particular as through-recesses in the holding element 66, wherein recesses 84*a* and 86*a* are formed in the second limb 68*b* and recesses 84*b* and 86*b* are configured in the first limb 68*a*. The recesses of a recess pair 82*a*, 82*b* are oriented in alignment with one another. The recesses 84*a*, 84*b* of the recess pair 82*a* in this case lie above the recesses 86*a*, 86*b* of the recess pair 82*b*.

A pin 88 is directed through the recesses 84*a*, 84*b* of the recess pair 82*a*. This pin holds a rotatable roller 90, wherein the roller 90 is arranged between the first limb 68*a* and the second limb 68*b*. In a corresponding manner, a pin 92 is directed through the recesses 86*a*, 86*b* of the recess pair 82*b* and holds a roller 94 between the first limb 68*a* and the second limb 68*b*, wherein this roller 94 is rotatable.

The first housing part 40 has through-openings 96*a*, 96*b*, 98*a*, 98*b*, which are aligned with recesses 84*a*, 84*b* and recesses 86*a*, 86*b*, when the holding element 66 is positioned in the housing interior 46. As a result, the pin 88, which has a head 100, can penetrate through the opening 96*a*, the recess 84*a*, the interstice between the first limb 68*a* and the second limb 68*b*, the recess 84*b* and the opening 96*b*. It is secured on the housing arrangement 34 by means of a counter-head 102. Accordingly, the pin 92 can then penetrate through the opening 96*a*, the recess 86*a*, the interstice between the first limb 68*a* and the second limb 68*b*, the recess 86*b* and the opening 98*b*, wherein it is secured by a counter-head corresponding to counter-head 102.

The first bearing device 36 is then configured, wherein the holding element 66 is also fastened on the first housing part 40 by means of the pins 88 and 92.

It is fundamentally possible that the rollers 90, 94 are fixed, i.e. are not rotatable, so that the slide rail 12 alone is disposed to slide. If the rollers 90, 94, between which the slide rail 12 lies, are rotatable, then a roller bearing arrangement is also provided. It is additionally possible that the rollers 90, 94 are formed directly by means of the pins 88 and 92.

Recess pairs 104*a*, 104*b* with through-recesses are also formed in the vicinity of the face end of the holding element 66, on which the connecting web 70 is arranged. In this case, recess pair 104*a* lies at the same height as recess pair 82*a* and recess pair 104*b* lies at the same height as recess pair 82*b*.

A respective pin 106, 108, which holds a roller for mounting of the slide rail 12 or on which a roller is formed for the slide mounting of the slide rail 12, is seated in the recesses of the recess pair 104*a* and the recesses of the recess pair 104*b*. It is fundamentally possible that the corresponding roller is seated rotatably or is seated non-rotatably on the associated pin 106 or 108. The second bearing device 38 is formed as a result.

The first housing part has an end wall 110, which faces towards the first end 20*a* of the slide rail 12. This face wall 110 is closed except for the recess 112, through which the slide rail 12 passes.

Moreover, the first housing part 40 has opposing side walls 114*a*, 114*b*, which are closed. In addition, the first housing part 40 has a respective closed wall on an underside 116 and on an upper side 118.

On a rear side of the first housing part 40, which faces away from the fixed arm 22, the first housing part 40 has a through-opening 120, through which the spindle 56 or the sliding arm 48 can pass. A force can then be exerted by means of the force application device 50 on the pressure piece 62, which sits on the holding element 66.

Moreover, on the longitudinal region 42 on an upper side the first housing part 40 has an opening 122, which allows a relative movement of the sliding arm 48 in the housing interior 46 to the housing arrangement 34 between the first bearing device 36 and the second bearing device 38.

In the housing interior 46 a roller holding element 124 is arranged adjacent to the face wall 110 or touching this. This roller holding element 124 serves to simplify the production of the clamp 10. It comprises a recess 126, through which the slide rail 12 can penetrate. In addition, it has recesses 128*a* and 128*b*, into which the rollers 90 and 94 can be inserted. As a result of this, the rollers 90 and 94 can be held temporarily in a correct position during production before insertion of the holding element 66.

In this case, on opposite sides the roller holding element 124 has a set-back region 129, onto which the holding element 66 is slid in the region of its face end, which is located opposite the connecting web 70.

In addition, the housing arrangement 34 has a second housing part 130, by means of which an opening 132 of the first housing part 40 is closed.

In this case, the opening 132 extends between the upper side 118 and the underside 116 and also between the side walls 114*a*, 114*b* of the first housing part 40. The opening 132 serves for insertion of the roller holding element 124, the sliding arm 48 and the holding element 66 into the housing interior 46 of the first housing part 40.

The opening 132 has a substantially rectangular cross-section.

The second housing part 130 is locked to the first housing part 40. For this, it has opposing lugs 134*a*, 134*b*, which tongue-shaped in particular, and which when the second housing part 130 is fastened on the first housing part 40 are inserted into the housing interior 46 and assure a lock fastening. In this case, the tongues 134*a*, 134*b* are associated with the upper side 118 and the underside 116 of the first housing part 40.

In addition, the second housing part 130 has laterally opposing tongues 136*a*, 136*b*, by means of which the second housing part 130 can be fastened to the first housing part 40 and in particular can be locked in position. The tongues 136*a*, 136*b* have a wavelike structure 138, for example. Opposing matching wavelike structures 140, which serve to receive the wavelike structure 138, are configured on the second housing part. The wavelike structure 140 on the second housing part 40 is configured so that it does not project into the housing interior 46, in which the holding element 66 is arranged. As a result, the wavelike structure 138 can be positioned laterally past the holding element 66.

It can be provided that the tongues 136*a*, 136*b* extend as far as an underside of the second housing part 130 and in this case have recesses 142*a*, 142*b* and also 144*a*, 144*b*. Recesses 142*a* and 142*b*, which are configured in particular as through-openings, are adapted to the recesses of the recess pair 104*a*. The recesses 144*a*, 144*b*, which are configured in particular as through-openings, are adapted to the recesses of the recess pair 104*b*.

The pins 106 and 108, which are seated on the holding element 66, project laterally beyond the first limb 68*a* and the second limb 68*b*. The second housing part 130 can then be placed on the holding element 66, wherein pin 106 projects at least partially into the recesses 142*a*, 142*b* and pin 108 is inserted at least partially into the recesses 144*a* and 144*b*. As a result, the second housing part 130 can be fastened to the holding element 66 and can thus in turn be held in addition to locking with the second housing part 130 by means of tongues 134*a*, 134*b* and locking by means of the tongues 136*a*, 136*b* (e.g. by positive-locking connection by means of the tongues 136*a*, 136*b*).

In particular, the second housing part 130 is made in one piece from a plastic material.

An abutment element 146, which is slid on in particular, sits on the second housing part 130. The abutment element 146 is preferably made from a plastic material. A second abutment surface 148 for a workpiece is formed on the abutment element 146. This second abutment surface 148 is substantially planar and is aligned substantially parallel to the first abutment surface 28 of the fixed arm 22. Moreover, the second abutment surface 148, which is arranged on the housing arrangement 34, is substantially perpendicular to the longitudinal direction 13 of the slide rail 12.

In addition, the second abutment surface 148 extends beyond the slide rail 12 from an upper side (relative to the slide rail 12) to an underside.

The second housing part 130 has a recess 150, which is configured as a through-opening. This is oriented in alignment to a recess 152 in the abutment element 146. The slide rail 12 is passed through the recesses 150 and 152.

The housing arrangement 34 is produced and fastened to the slide rail 12 as follows:

The rollers 90 and 94 are inserted into the roller holding element 124. The roller holding element 124 with the inserted rollers 90 and 94 is inserted into the housing interior 46 of the first housing part 40 until roller 90, which is hollow cylindrical, is oriented in alignment with the openings 96*a*, 96*b* and roller 94 is aligned to the openings 98*a*, 98*b*.

In particular, the roller holding element 124 is configured such that the aligned arrangement is reached on abutment against the inside of the face wall 110, wherein the roller holding element 124 accordingly has a height corresponding to the inside height of the housing interior 46 on the inner side of the face wall 110.

The slide rail 12 has either already been pushed through the recess 112 beforehand or is pushed through after positioning of the roller holding element 124.

After positioning of the roller holding element 124, the sliding arm 48 is placed on the slide rail 12 and brought into the housing interior 46. In this case, the force application device 50 can already be arranged on the sliding arm without the pressure piece 62, or it can be fastened subsequently.

The pressure piece 62 is fastened on the provided holding element 66 in the slots 76*a*, 76*b*.

In addition, the pins 106 and 108 are fastened for configuration of the second bearing device 38.

The accordingly prepared holding element 66 is then inserted into the housing interior 46 via the opening 132 with its open face end. It is possible in this case that the second housing part 130 is already placed on the holding element 66, wherein in particular the pins 106 and 108 are inserted into corresponding recesses 142*a*, 142*b* or 144*a*, 144*b* of the second housing part 130.

The holding element 66 is displaced until the first limb 68*a* and the second limb 68*b* overlap the corresponding abutment region 129 of the roller holding element 124. As a result, the rollers 90 and 94 are correctly positioned with respect to the recess pairs 82*a* and 82*b*. With corresponding adaptation of the holding element 66 to the first housing part 40, the correct alignment is achieved, if the first housing 40 is closable with the second housing part 130. The closure is achieved by locking, wherein, as mentioned above, the second housing part 130 is displaced with the holding element 66 or the second housing part 130 is attached subsequently.

In both cases, the slide rail 12 is directed through the recess 150.

The abutment element 146 is then put in place and in particular slid on from the side. The recess 152 is accordingly slot-shaped.

The pin 98 is passed through the openings 96*a*, 96*b* and secured with the counter-head 102. In this case, with the corresponding alignment of the holding element 66, the pin 88 is passed through the roller 90 and through the recesses 84*a*, and 84*b*.

The pin 92 is passed through in the same manner.

As a result, the housing arrangement 34 with sliding arm 48 arranged therein is produced, wherein the second abutment surface 148 is also provided. In addition, the first bearing device 36 and the second bearing device 38 are formed for the slide rail 12.

The spindle 56 is rotated at the handle 86, so that its holding head enters the holding head locating space 64 of the pressure piece 62. The pressure piece 62 is then fastened on the force application device 50.

If the slide rail 12 is provided with a raised section 24 (or with grooved pins, as will be described in more detail below on the basis of a second exemplary embodiment), then it is necessary that the individual parts of the housing arrangement 34 are firstly threaded from the end 20*a* of the slide rail 12 onto the slide rail 12 before they are assembled; in this case, the threading occurs in this sequence: the abutment element 146, the second housing part 130, the holding element 66, the roller holding element 124 and the first housing part 40. As described above, the roller holding element 124 is then positioned in the housing interior 46, the holding element 66 is attached, the housing interior 46 is closed by the second housing part 130 and the abutment element 146 is attached. After positioning the holding element 66 the pins 88 and 92 are positioned and secured.

The fixed arm 22 of the clamp 10 is fixably displaceable. It is fastened on the slide rail 12, i.e. during use of the clamp 10 if one or more workpieces are to be clamped between the first abutment surface 26 of the fixed arm 22 and the second abutment surface 148 of the housing arrangement 34, it is fastened to be immovable relative to the slide rail 12. However, its position on the slide rail 12 relative to the first end 20*a* or the second end 20*b* is adjustable.

Figure 4:
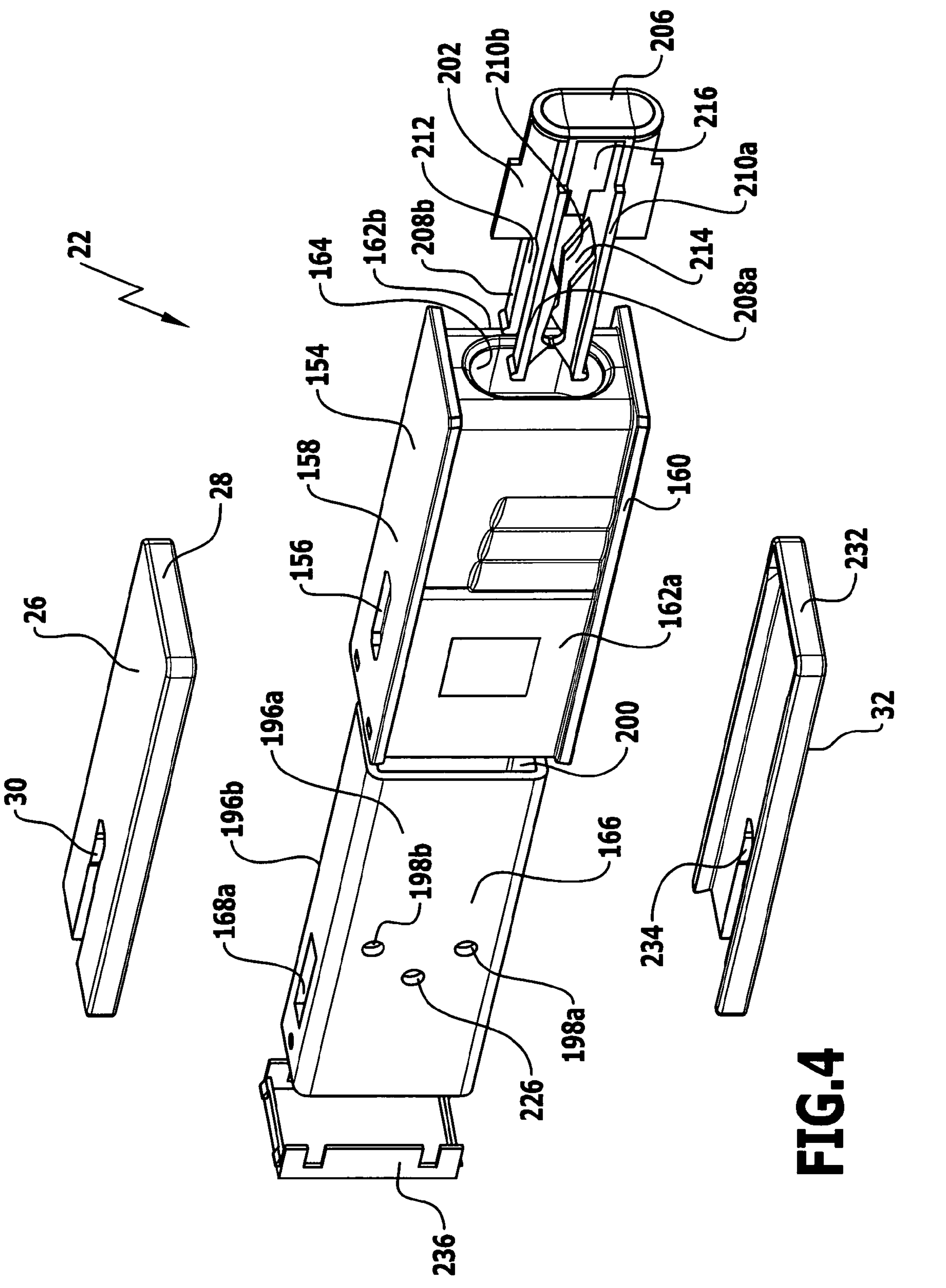
FIG. 4 is an exploded representation of a fixed arm of the clamp according to FIG. 1.
Figure 5:
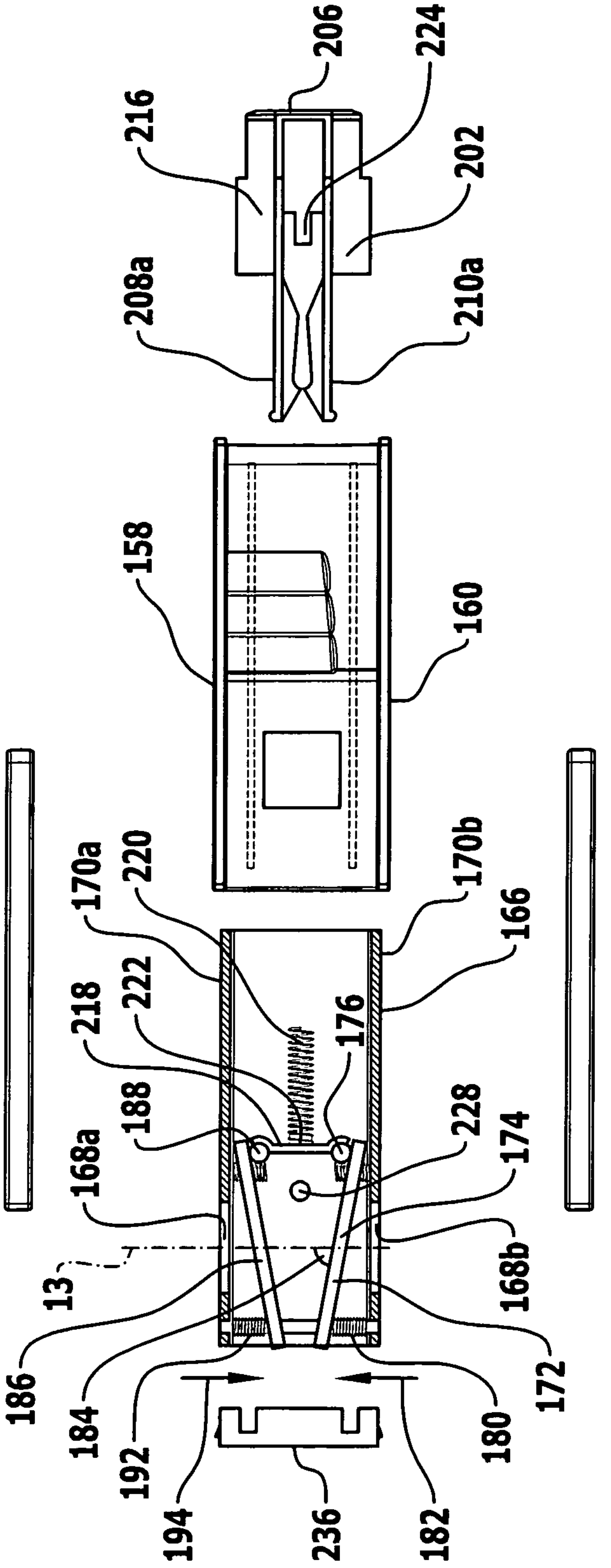
FIG. 5 is a plan view onto a fixed arm according to FIG. 4 (in exploded representation)
Figure 6:
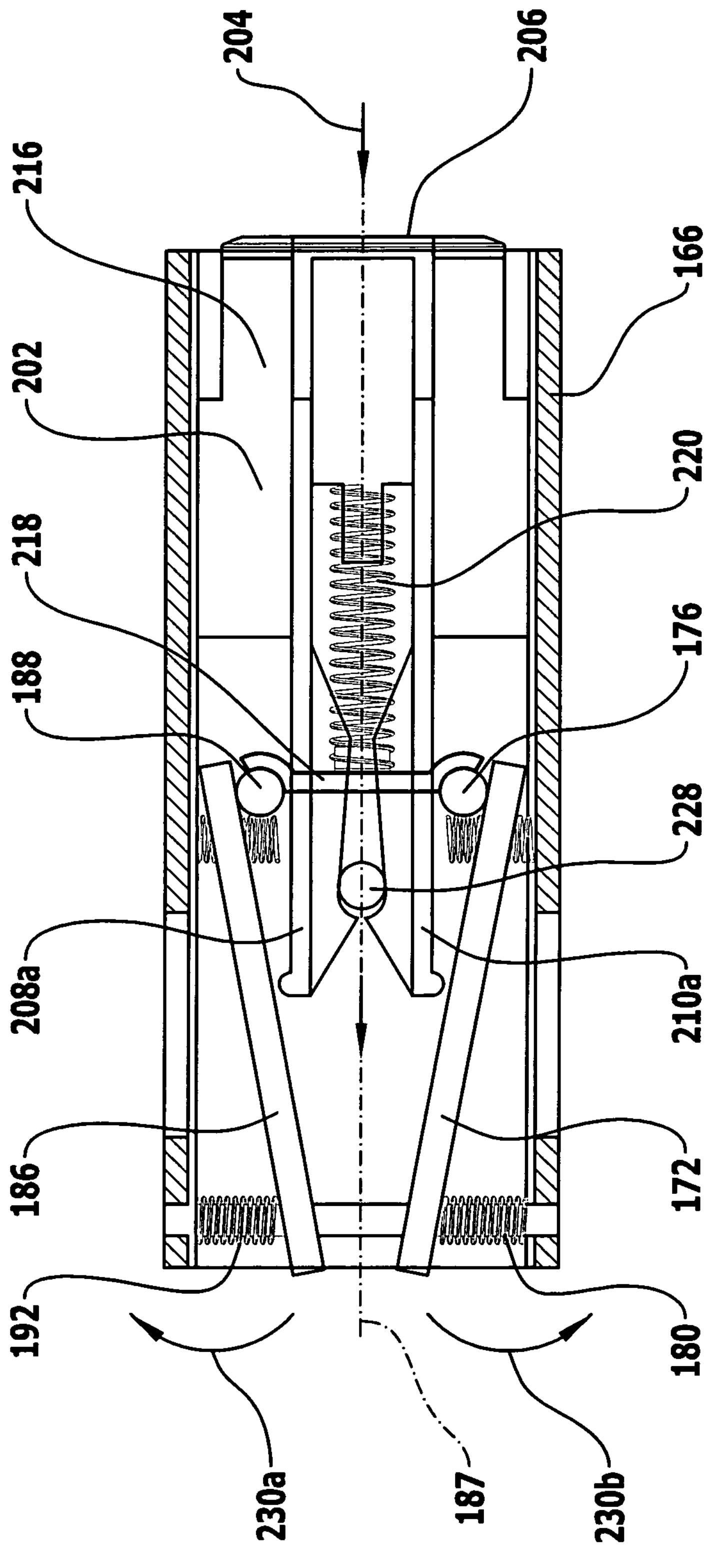
FIG. 6 is a sectional view of the fixed arm according to FIG. 1 in line 6-6.

In an exemplary embodiment, which is shown in FIGS. 4 to 6, the fixed arm 22 comprises a housing 154. This housing 154 is, for example, made from a plastic material and configured in a single part or multiple parts. The housing 154 has an at least approximately cuboidal structure. A first opening 156 is arranged on a first housing wall 158 in the housing 154. An opening oriented in alignment with the first opening 156 (not visible in the drawings) is provided on a second housing wall 116 located opposite the first housing wall. The slide rail 12 is directed through these openings.

Opposing side walls 162*a* and 162*b* lie between the first housing wall 158 and the second housing wall 160.

A holding element 166 is arranged in a housing interior 164 of the housing 154. The holding element 166 serves to hold a mechanism to releasably fasten the fixed arm 22 to the slide rail 12 and in particular is made from a metal material.

The holding element 166 comprises through-openings 168*a*, 168*b* oriented in alignment with one another, which on positioning in the housing interior 164 are in alignment with the openings of the housing 154 for the slide rail 12; the slide rail 12 is passed through the holding element 166 via the openings 168*a*, 168*b*.

Opening 168*a* is formed on a wall 170*a* and opening 168*b* is formed on a wall 170*b* of the holding element 166. The walls 170*a* and 170*b* are spaced from one another. Wall 170*a* is oriented substantially parallel to the first housing wall 158*a* and wall 170*b* is oriented substantially parallel to the second housing wall 160.

A first blocking element 172 (brake element), which in particular is plate-shaped with a slot 174, through which the slide rail 12 is guided, is seated on the holding element 166 between wall 170*a* and wall 170*b*. The first blocking element 172 is disposed to pivot, so that its inclined position relative to the slide rail 12 is variable.

For the pivoting mounting, a pin 176 is arranged on the holding element 166 in the vicinity of the wall 170*b* at a distance therefrom. A virtual pivot axis for the pivoting ability of the first blocking element 172 on the holding element 166 is provided by the pin 176. This virtual pivot axis lies in a contact line between the holding element 166 and the pin 176. The first blocking element 172 is inserted between this pin 176 and the wall 170*b*.

The pin 176 lies on one side relative to the opening 168*b*. On the opposite side a further spring 180 is mounted on the wall 170*b* that acts on the first blocking element 172 on or in the vicinity of an end remote from the end, which lies in the vicinity of the pin 176. The spring 180 is a pressure spring with a spring force in a direction 182 that is substantially parallel to the longitudinal direction 13 of the slide rail 12. The spring 180 presses the first blocking element 172 into an inclined position to the slide rail 12, which is a locking position; in this locking position the fixed arm 22 is non-displaceable at least in one direction on the slide rail 12 and is fastened to this as a result. In this locking position the first blocking element 172 lies at an angle 184 to the longitudinal direction 13 of the slide rail 12. This angle is in the order of 80°, for example.

The first blocking element 172 can be pivoted by exerting force against the spring force of the spring 180 in the direction of the wall 170*b*. As a result, a blocking position can be released.

A second blocking element 186 is additionally arranged to pivot in the holding element 166. For this, a pin 188 is provided, which is spaced from the wall 170*a* and adjacent to this. In this case, the pin 188 lies at the same distance from the slide rail 12 as pin 176 and at the same distance from the wall 170*a* as pin 176 is from wall 170*b*.

In addition, a spring 192 with the same function as the spring 180 is fastened to the wall 170*a*. A spring force of the spring 192, which is also a pressure spring, acts in a direction 194, which is a contrary direction to direction 182.

The second blocking element 186 is arranged mirror-symmetrically (to a mirror plane 187) to the first blocking element 172 with a mirror axis perpendicular to the slide rail 12. If the first blocking element 172 has a locking position with an angle 184, then the second blocking element 186 has a locking position with an angle to the longitudinal direction 13 of the slide rail 12, which has the opposite sign to angle 184.

The movement of the fixed arm 22 on the slide rail 12 is blocked in a first direction by the first blocking element 172. The movement in the contrary direction thereto is blocked by the second blocking element 186. In the exemplary embodiment shown in FIG. 5, the first blocking element 172 blocks the movement of the fixed arm 22 on the slide rail 12 in direction 194. The second blocking element 186 blocks the movement of the fixed arm 22 on the slide rail 12 in direction 182. In the locking position of the first blocking element 172 and the second blocking element 186, these are tilted with the slide rail 12 and the movement relative to the slide rail 12 is blocked in the corresponding direction. The tilting can be assisted by the abovementioned grooving of the slide rail 12.

(Virtual) pivot axes for the pivoting ability of the first blocking element 172 and the second blocking element 186 are provided on the holding element 166 by means of pins 176 and 188. In the shown exemplary embodiment, the pins 186 and 188 lie on the same side relative to the slide rail 12; thus the pivot axes also lie on the same side. It is also fundamentally possible that the corresponding pivot axes lie on different sides. In a locking position the first blocking element and the second blocking element are then preferably oriented parallel, wherein the arrangement is such that the first blocking element and the second blocking element can pivot in different pivoting directions.

Opposing walls 196*a*, 196*b* extend between the walls 170*a* and 170*b*. These walls have recesses 198*a*, 198*b*, to which the pins 190 and 176 are fastened. An interior 200 is formed between the walls 170*a*, 170*b*, 196*a* and 196*b*, in which the first blocking element 172 and the second blocking element 186 are arranged together with the associated blocking mechanism.

A pressure element 202, which is displaceably guided in a direction 204 transverse and in particular perpendicular to the longitudinal direction 13 of the slide rail 12, is arranged on the holding element 166.

The pressure element 202 has an operating end 206 (push-button), which lies on an upper side of the fixed arm 22. This upper side is the side, which is at the greatest distance from the sliding arm or which lies at least approximately at the same height as the upper side 118 of the first housing part 40.

The pressure element 202 is arranged in the interior 200 of the holding element 166, wherein the holding element 166 provides a guide means for the displacement guidance (sliding guidance) of the pressure element 202 on wall 196*a* and wall 196*b*.

The pressure element 202 has a first limb pair with limbs 208*a*, 208*b* and a second limb pair with limbs 210*a*, 210*b*. The limbs 208*a*, 208*b* lie on the same side relative to the mirror plane of the first blocking element 172 and the second blocking element 186. The limbs 208*a* and 208*b* are spaced from one another with an interstice 212 between them. They have fundamentally the same ability to move.

The limbs 210*a*, 210*b* of the second limb pair lie on the other side of this mirror plane. They are spaced from one another with an interstice 214 between them. They have the same ability to move. The interstices 212 and 214 serve for the slide rail to pass through, so that the pressure element 202 does not come into contact with the slide rail.

The limbs 208*a*, 208*b* and 210*a*, 210*b* are elastically arranged on a base body 216 of the pressure element 202, so that they can bend outwards and can return to their starting position. In particular, the limbs 208*a*, 208*b*, 210*a*, 210*b* are formed in one piece on the base body 16, so that the pressure element 202 is in one piece.

A web element 218 is arranged between the pins 188 and 176 in the interior 200. A spring 220 is supported on this web element. For example, a cylindrical raised section 222, on which the spring 220, which in particular is a pressure spring, is placed is arranged on the web element 18 for this purpose.

At an end opposite the raised section 222, the spring 220 is supported on the base body 216 of the pressure element 202. For this, the latter has the central cylindrical raised section 224, on which the spring 220 is placed. In this case, the raised section 224 lies on the mirror plane for the first blocking element 172 and the second blocking element. 186. The spring 224 is designed in this case so that it does not exert any spring force on the pressure element 202, when this is in its "normal position", in which the movement of the fixed arm 22 on the slide rail 12 is blocked.

The interaction of the pressure element 202 with the blocking elements 172 and 186 is shown in FIG. 6. A pin 228, which lies between the first limb pair and the second limb pair, is positioned in openings 226 of walls 196*a* and 196*b*. In the "normal state", the limbs 208*a*, 208*b*, 210*a*, 210*b* do not act on the blocking elements 172 and 186.

If the pressure element 202 is pressed further into the interior 200 in the direction 204, and thus is pressed against the spring force of the spring 220, then an inner side of the limbs 208*a*, 208*b* and 210*a*, 21*b* runs along the pin 28. In this case, the configuration of the inner side is such, i.e. it is configured with such a slope, that the limbs of the first limb pair and the second limb pair are pressed apart as a result of the displacement of the pressure element 202 and thus of the limbs 208*a*, 208*b*, 210*a*, 210*b* in the direction 204. This is indicated in FIG. 6 by the arrows with the references 230*a* and 230*b*. In addition, limbs 208*a*, 208*b* act on the second blocking element 186 and limbs 210*a*, 210*b* act on the first blocking element 172 and pivot these in opposite directions. This is also indicated in FIG. 6 by the arrows 230*a* and 230*b*. Thus, the inclined position of the first blocking element 172 and the second blocking element 186 is changed by the pressure element 202, i.e. the angle to the longitudinal direction 13 of the slide rail 12 is increased in the direction of 90° and the blocking arrangement is thus released. Moreover, as a result of this the fixed arm 22 can be displaced on the slide rail 12 and brought into the desired position.

When the pressure element 202 is released, i.e. when no more force is exerted, then the spring 220 presses the pressure element 202 in the contrary direction to direction 204 and the force application of the blocking elements 172 and 186 is removed by the first limb pair and the second limb pair. The blocking element 172 and the second blocking element 186 thus moves into its inclined locking position, in which the movement of the fixed arm 22 on the slide rail 12 is blocked.

The abutment element 28 is arranged on the housing 154 and in particular is slid thereon. This is thus slid onto the first housing wall 158 in particular.

A further abutment element 232, which is likewise provided with a slot-shaped recess 234 for the slide rail 12, is slid onto the opposite housing wall 160. The further abutment surface 32 is formed on this abutment element 232.

The housing 154 is closed on an underside by a cover element 236. The interior 200 is thus closed except for the openings for the slide rail 12.

Figure 7:
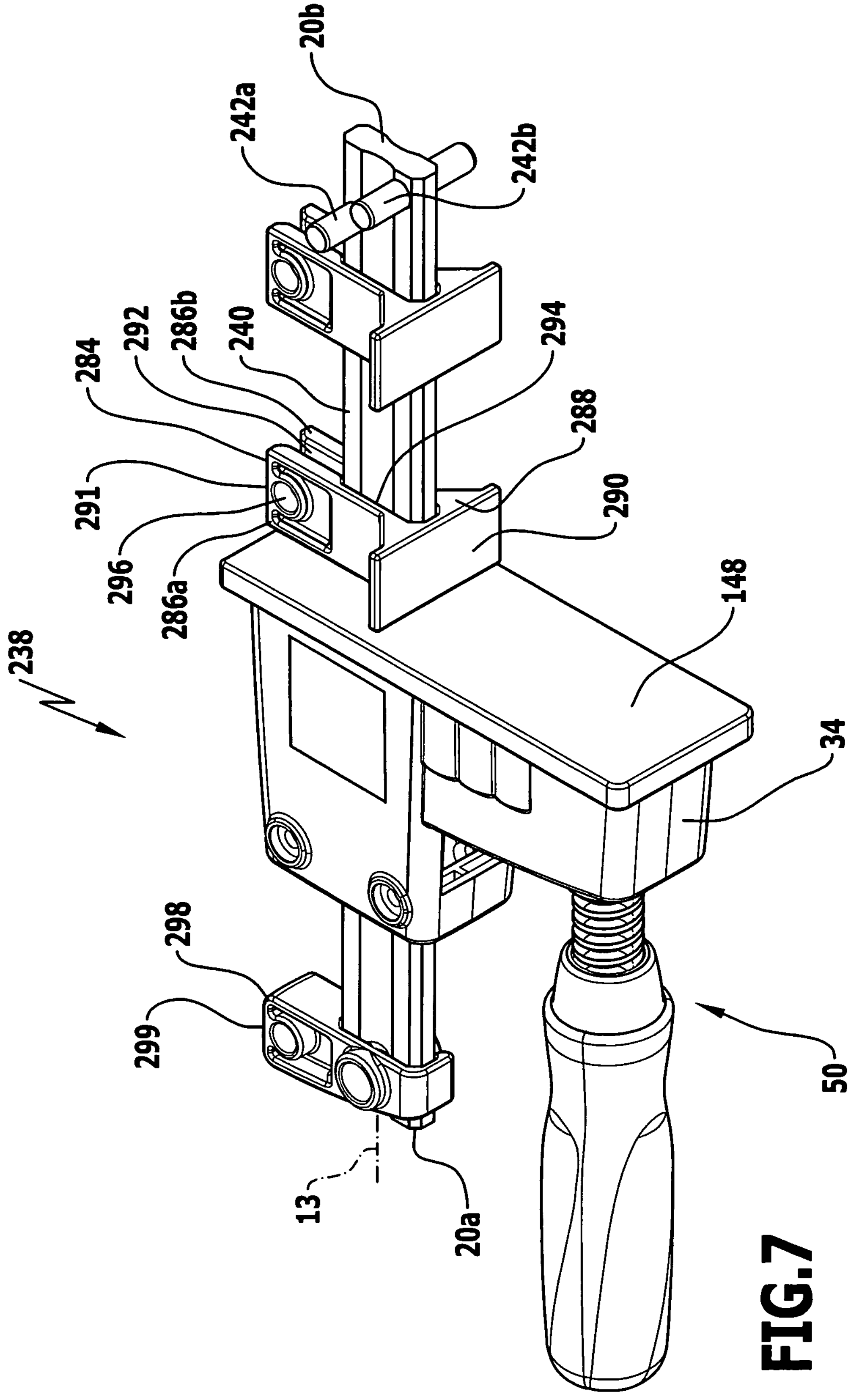
FIG. 7 is a perspective view of a second exemplary embodiment of a clamp according to the invention, wherein the fixed arm is not shown.

In a further exemplary embodiment of a clamp according to the invention, which is shown in FIG. 7 in a part-representation and is given the reference 238 there, the housing arrangement is configured fundamentally the same as in the clamp 10. Therefore, the same reference numerals are used. The housing arrangement 34 is guided on a slide rail 240, which is configured fundamentally the same as slide rail 12. However, pins 242*a*, 242*b* are fastened to the slide rail 240 in the vicinity of the end 20*b*. These pins 242*a*, 242*b* are configured in particular as grooved pins. They project perpendicularly to the longitudinal direction 13 of the slide rail 240. Thus, they project beyond the two opposite sides. In this case, it is possible in principle that a through-pin 242*a* or 242*b* projects on both sides, wherein the slide rail 240 is then provided with corresponding openings, in which the pins 242*a* and 242*b* are then fastened and in particularly pressed in.

It is also possible that pins are fastened to project on one side. If two pins are then arranged on one side, a total of four pins are required.

Figure 8:
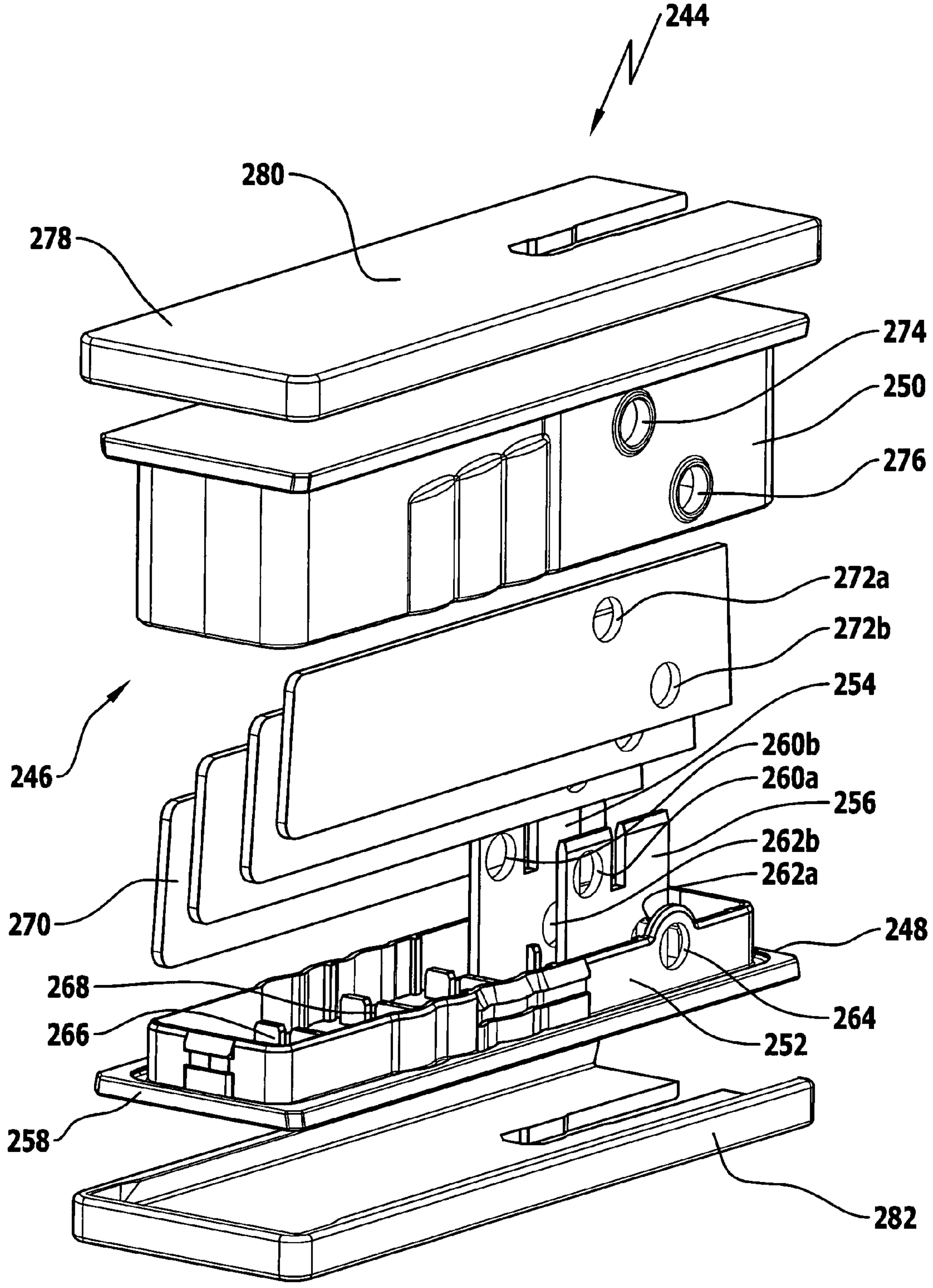
FIG. 8 is an exploded representation of a fixed arm for the clamp according to FIG. 7.

The pins 242*a*, 242*b* serve to fasten a fixed arm 244, which is shown in an exploded view in FIG. 8.

The fixed arm 244 comprises a housing 246 with a first housing part 248 and a second housing part 250. The first housing part 248 has a peripheral edge region 252. Within this edge region 252 a first tongue 254 and a second tongue 256 are arranged, which project perpendicularly beyond a base 258 of the first housing part 248.

Aligned openings 260*a*, 260*b* to receive the pins 242*b* and openings 262*a*, 262*b* to receive the pin 242*a* are arranged in the first tongue 254 and the second tongue 256. In this case, openings 264 aligned to openings 262*a*, through which the pin 242*a* can also pass, are arranged in the edge 252, which is raised.

Holding elements 266 spaced within the edge region 252 on the base 258 are arranged on the first housing part 248. These project upwards. They have slot-like recesses 268, wherein a plurality of holding elements 266 are provided and the recesses 268 are oriented in alignment with one another. In the shown exemplary embodiment, a holding element 266 has four recesses 268.

In this case, the recesses 268 are arranged such that two respective recesses 268 are associated with the first tongue 254 and two recesses 268 are associated with the second tongue 256.

Holders 270 are positioned in the recesses 268. In particular, the holders 270 are metal sheets. The holders 270 in turn have respective openings 272*a* and 272*b* for the pins 242*a* and 242*b* to pass through.

The holders 270 are inserted into the recesses 268. In this case, a respective holder 270 lies in front of the first tongue 254 and behind the first tongue 254, so that the first tongue 254 lies between adjacent holders 270. Moreover, a respective holder 270 lies in front of the second tongue 256 and behind the second tongue 256, so that the second tongue 256 lies between adjacent holders 270. Openings 272*a* in the holders 270 and openings 260*a*, 260*b* as well as openings 272*b* in the holders 270 and openings 262*a* and 262*b* as well as openings 264 are oriented in alignment in this case.

The second housing part 250 is placed on the first housing part 248, wherein this has openings 274 and 276 for pins 242*b*, 242*a* to pass through.

An abutment element 278, on which a first abutment surface 280 is formed, is arranged on the first housing part 248 and in particular is slid onto this. An abutment element 282, on which a further abutment surface is formed, is also slid onto the second housing part 250.

The first housing part 248 and the second housing part 250 are made from a plastic material, which is sufficiently elastic to allow assembly with the fastening to the slide rail 240.

During assembly, two holders 270 are placed on the slide rail 240 with their pins 242*a*, 242*b*. The first tongue 254 and the second tongue 256 of the first housing part 248 are then set in place. Outer holders 270 are then set in place. The holders 270 are then positioned in the recesses 268 of the first housing part 248, i.e. these are inserted.

The second housing part 250 is then set in place, wherein its walls with openings 274, 276 are deformed so that placement is possible.

It is also fundamentally possible that the fixed arm 44 is firstly assembled, it is then placed on the slide rail 240 and then the pins 242*a*, 242*b* are fastened on the slide rail 240 through the corresponding openings.

By providing two holders 270, which are associated with each tongue 254, 256, a high force load capacity results in both directions (force application on the first abutment surface 280 and the further abutment surface on the abutment element 282).

One or more slide rail abutment elements 284 sit on the slide rail 12 or 240. In particular, a slide rail abutment element 284 is made from a plastic material and configured in one piece. It comprises (FIG. 7) a first limb 286*a* and a second limb 286*b*. These limbs 286*a*, 286*b* are connected by means of an abutment region 288, which provides a (first) abutment surface 290. The abutment surface 290 is oriented transversely and in particular perpendicularly to the first abutment surface 26 or 280 and to the second abutment surface 148. The abutment surface 290 lies below the slide rail 12 or 240 on one side, on which the force application device 50 is arranged. It thus lies facing a workpiece, which is clamped between the fixed arm 22 or 244 and the housing arrangement 34.

On an opposite end the slide rail abutment element 284 has a second abutment surface 291, which is configured on the limbs 286*a* and 286*b*. The clamp can be placed on a support by means of these. In this case, the slide rail abutment element 284 is configured in such a manner that this abutment surface 291 projects beyond the housing arrangement 34. The housing arrangement is set back relative to the abutment surface 291. A typical dimension for the spacing between the housing arrangement 34 and the abutment surface 291 lies at 1 mm or less. If the clamp is set in place by means of the fixed arm 22 or 244 and a slide rail abutment element with abutment surface 291, then the housing arrangement 34 is displaceable on the slide rail 12 or 240 as a result of the set-back arrangement.

The housing arrangement 34 preferably has a smaller maximum height above the slide rail 12 or 240 than the fixed arm 22 or 244, i.e. on the side remote from the force application device 50. The difference in height lies in the order of 1 mm or less. This enables a displaceability of the housing arrangement 34 to be achieved in the case of a placement on abutment surfaces 291 by means of slide rail abutment elements 284, as described.

A slide rail abutment element 284 is configured such that it can be clipped onto the slide rail 12 or 240. The first limb 286*a* and the second limb 286*b* are configured to be sufficiently elastic and are arranged on the abutment region 288 such that they can be spread apart and an interstice 292 can be formed on the slide rail 12 or 240 between the first limb 286*a* and second limb 286*b*, i.e. the slide rail 12, 240 can be inserted into the interstice 292.

A respective recess 294 in the form of a depression, which is adapted in shape to the slide rail 12 or 240, is configured on the first limb 286*a* and the second limb 286*b*. The slide rail 12 or 240 can be received in this recess 294. When the slide rail abutment 294 is clipped in place, a positive-locking arrangement is achieved by means of the recess 294 (transversely to the longitudinal direction 13).

With respect to the longitudinal direction 13 of the slide rail 12 or 240 a slide rail abutment element 284 is held in frictional engagement, so that it is displaceable on the slide rail 12 or 240 and can be positioned at a desired position, but in this case an expenditure of force is necessary for the displacement (overcoming the friction force).

The abutment surface 290 has a width that is larger than the width of the slide rail 12, 240. For example, the abutment surface 290 has a width that corresponds to the width of the second abutment surface 148 or the width of the first abutment surface 26 or 280.

The slide rail abutment element 284 does not project beyond an underside of the fixed arm 22 or 244. This enables the clamp to be placed on a support such as a bench via the corresponding underside of the fixed arm 22 or 244.

In this case, an opening 296 can be respectively arranged in a region lying above the slide rail 12 or 240 (a region between the abutment surface 291 and the slide rail 12 or 240) in the limbs 286*a*, 286*b*. In particular, one or more slide rail abutment elements 284 are arranged between the housing arrangement 34 and the sliding arm 22 or 244. A pin element (bolt) of a corresponding bracket such as e.g. the bench bracket TK6 of BESSEY Tool GmbH & Co. KG can be passed through the openings 296. As a result, a slide rail abutment element can be clamped to a support (in particular a bench) and thus the clamp itself can be clamped to the support.

The clamp 10 or 238 can be placed on a workpiece by means of one or more slide rail abutment elements 284. In this case, it is possible that the clamp is placed on the workpiece in the region of the slide rail abutment element or elements 284 with the abutment surface or surfaces 290.

Moreover, it is possible to place the clamp on a support in rotated position with the abutment surface or surfaces 291 and an underside of the fixed arm 22 or 244.

In addition, workpiece surfaces are protected from contact with the slide rail 12 or 240, which is made from metal material in particular, by one or more slide rail abutment elements 284.

The slide rail abutment elements 284 are removable from the slide rail 12 or 240.

A locking element 298, which in particular is clipped in place and made from a plastic material, can be arranged on the end 20*a* of the slide rail 12 or 240. The locking element 298 serves to prevent the removal of the housing arrangement 34 from the slide rail 12 or 240. The locking element 298 has an abutment surface 299, which is oriented to be substantially in alignment with an abutment surface 291 of a slide rail abutment element 284, so that the clamp can be placed on a support.

The clamp 10 or 238 according to the invention functions as follows:

The fixed arm 22 or 244 is fastened to the slide rail 12 or 240. To clamp one or more workpieces in place between the housing arrangement 34 and the fixed arm 22 or 244, the housing arrangement 34 is pushed onto the corresponding workpiece with its second abutment surface 148. The force application device 50 is thus released such that an application of force is possible by means of the pressure piece 62 by rotation of the spindle 56. The spindle 56 is than rotated by means of the handle 60. The sliding arm 48 is thus tilted on the slide rail 12 or 240 under the exertion of pressure by means of the housing arrangement 34 onto the corresponding workpiece. As a result, clamping is achieved between the first abutment surface 26 or 280 and the second abutment surface 148.

The clamp 10 or 238 according to the invention can be produced in a simple and inexpensive manner. The housing arrangement 34 can be quickly assembled in a simple and inexpensive manner. The assembly of the clamp 10 or 238 can be conducted quickly from the small number of individual parts.

The invention claimed is:

1. Clamp, comprising:

a slide rail;

a fixed arm, which is fastened to the slide rail and on which a first abutment surface for a workpiece is arranged;

a sliding arm, which is displaceable on the slide rail;

a housing arrangement, on which are held a first bearing device and a second bearing device spaced from the first bearing device, by means of which the housing arrangement is displaceably guided on the slide rail;

wherein the sliding arm is positioned between the first bearing device and the second bearing device;

wherein there is arranged on the housing arrangement a second abutment surface for the workpiece or another workpiece, the second abutment surface facing the first abutment surface;

wherein a force application device is provided, which is held on the sliding arm and which acts on a pressure piece which is held on the housing arrangement;

wherein the housing arrangement has a first housing part with a housing interior having an opening, which faces the first abutment surface and by means of which the sliding arm is adapted to be brought into the housing interior during production of the clamp;

wherein a second housing part is fastened to the housing arrangement to close the opening;

wherein the opening in the housing interior is closed by the second housing part at a face opposite the second abutment surface except for a recess, through which the slide rail is passed;

wherein a holding element is arranged in the housing interior to hold the first bearing device, the second bearing device and the pressure piece; and wherein a roller holding element is arranged in the housing interior to hold rollers of the first bearing device.

2. The clamp according to claim 1, wherein the second housing part is configured as a housing cover.

3. The clamp according to claim 1, wherein the second housing part is locked on the housing arrangement.

4. The clamp according to claim 1, wherein the second housing part is fastened to the first housing part.

5. The clamp according to claim 1, wherein an abutment element, on which the second abutment surface is formed, is held at least partially on the second housing part.

6. The clamp according to claim 1, wherein at least one of the first housing part and the second housing part are made from a plastic material.

7. The clamp according to claim 1, wherein the first housing part has a structure, which is L-shaped in cross-section, with a longitudinal region, which extends along the slide rail, and with a transverse region, which extends transversely to the slide rail.

8. The clamp according to claim 7, wherein the first bearing device and the second bearing device are arranged on the longitudinal region.

9. The clamp according to claim 7, wherein the pressure piece is arranged on the transverse region.

10. The clamp according to claim 1, wherein the holding element holds rollers of the second bearing device.

11. The clamp according to claim 10, wherein one or more of the rollers of at least one of the first bearing device and the second bearing device are rotatably held.

12. The clamp according to claim 1, wherein the holding element has pairs of recesses respectively with a first recess and an opposing second recess, in which a pin is respectively seated.

13. The clamp according to claim 12, wherein the second housing part has opposing tongues with recesses, into which the pins of the second bearing device are at least partially inserted.

14. The clamp according to claim 1, wherein the holding element is made from a metal material.

15. The clamp according to claim 1, wherein the holding element comprises a first limb, a parallel spaced second limb and on a face at least one connecting web between the first limb and the second limb.

16. The clamp according to claim 15, wherein the first limb and the second limb are respectively L-shaped.

17. The clamp according to claim 15, wherein the at least one connecting web is positioned in a region of the opening of the first housing part.

18. The clamp according to claim 15, wherein the holding element has an open face, which lies opposite the face with the at least one connecting web.

19. The clamp according to claim 1, wherein the roller holding element is arranged in a region of a first face of the first housing part remote from the fixed arm.

20. The clamp according to claim 1, wherein the roller holding element has a first recess pair of spaced recesses and a second recess pair of spaced recesses, in which the respective roller is inserted.

21. The clamp according to claim 1, wherein the holding element is slid with an open end onto the roller holding element.

22. The clamp according to claim 1, wherein the first housing part comprises recesses, into which pins of the first bearing device are at least partially inserted.

23. The clamp according to claim 1, wherein the first abutment surface and the second abutment surface are aligned substantially parallel to one another.

24. The clamp according to claim 1, wherein the first abutment surface and the second abutment surface are oriented substantially perpendicularly to a longitudinal direction of the slide rail.

25. The clamp according to claim 1, wherein the slide rail is guided through the first abutment surface and the second abutment surface.

26. The clamp according to claim 1, wherein the housing interior is closed on at least one of an underside and an upper side of the housing arrangement.

27. The clamp according to claim 1, wherein the housing interior is laterally closed.

28. The clamp according to claim 1, wherein the fixed arm is arranged to be fixably displaceable on the slide rail.

29. The clamp according to claim 1, wherein:

the fixed arm has at least one blocking element, which in a locking position blocks movement of the fixed arm relative to the slide rail at least in one direction, and an actuation device is provided, by means of which an inclination of the at least one blocking element is variable such that the fixed arm is displaceable on the slide rail for adjustment of its position on the slide rail.

30. The clamp according to claim 29, wherein the at least one blocking element is a plate with a recess, through which the slide rail is guided.

31. The clamp according to claim 29, wherein a first blocking element is provided, which in a first locking position blocks the displaceability of the fixed arm on the slide rail in a first direction, and a second blocking element is provided, which in a second locking position blocks the displaceability of the fixed arm on the slide rail in a second direction, which is contrary to the first direction.

32. The clamp according to claim 31, wherein an angular position of the first blocking element in the first locking position is opposed to an angular position of the second blocking element in the second locking position.

33. The clamp according to claim 29, wherein the at least one blocking element is spring-loaded, and a spring force presses the at least one blocking element into the locking position.

34. The clamp according to claim 29, wherein the at least one blocking element is arranged to be able to pivot relative to the slide rail on the fixed arm.

35. The clamp according to claim 1, wherein an actuation device has a pressure element, which is linearly displaceable on the fixed arm.

36. The clamp according to claim 35, wherein a pivoting movement of at least one blocking element can be actuated by the pressure element.

37. The clamp according to claim 35, wherein the pressure element is spring-loaded, and for the pressure element to act on at least one blocking element a force must be exerted against a spring force.

38. The clamp according to claim 35, wherein the pressure element can be actuated from an upper side or underside of the fixed arm.

39. The clamp according to claim 1, wherein at least one slide rail abutment element is seated on the slide rail and has at least one abutment surface, which is oriented transversely to the first abutment surface and transversely to the second abutment surface.

40. The clamp according to claim 39, wherein the at least one slide rail abutment element is detachably held on the slide rail.

41. The clamp according to claim 39, wherein the at least one slide rail abutment element is clipped onto the slide rail.

42. The clamp according to claim 39, wherein the at least one slide rail abutment element is displaceable on the slide rail.

43. The clamp according to claim 39, wherein the at least one slide rail abutment element is made from a plastic material.

44. The clamp according to claim 39, wherein the at least one slide rail abutment element is configured in one piece.

45. The clamp according to claim 39, wherein the at least one slide rail abutment element has an abutment region, a first limb and a second limb.

46. The clamp according to claim 45, wherein a recess adapted to the slide rail is configured on at least one of the first limb and on the second limb of the at least one slide rail abutment element.

47. The clamp according to claim 45, wherein the first limb and the second limb are elastic in configuration and/or are held resiliently on the abutment region.

48. The clamp according to claim 39, wherein the at least one abutment surface of the at least one slide rail abutment element is below the slide rail on a side, on which the force application device is positioned.

49. The clamp according to claim 39, wherein the at least one abutment surface of the at least one slide rail abutment element has a larger width than the slide rail.

50. The clamp according to claim 39, wherein the at least one slide rail abutment element does not project beyond the fixed arm at an end opposite the at least one abutment surface of the at least one slide rail abutment element.

51. The clamp according to claim 39, wherein the at least one slide rail abutment element projects beyond the housing arrangement at an end opposite the at least one abutment surface of the at least one slide rail abutment element.

52. The clamp according to claim 39, wherein the at least one slide rail abutment element is arranged between the housing arrangement and the fixed arm.

53. Method for producing a clamp, said clamp comprising:

a slide rail;

a fixed arm, which is fastened to the slide rail and on which a first abutment surface for a workpiece is arranged;

a sliding arm, which is displaceable on the slide rail;

a housing arrangement, on which are held a first bearing device and a second bearing device spaced from the first bearing device, by means of which the housing arrangement is displaceably guided on the slide rail;

wherein the sliding arm is positioned between the first bearing device and the second bearing device;

wherein there is arranged on the housing arrangement a second abutment surface for the workpiece or another workpiece, the second abutment surface facing the first abutment surface;

wherein a force application device is provided, which is held on the sliding arm and which acts on a pressure piece which is held on the housing arrangement;

wherein the housing arrangement has a first housing part with a housing interior having an opening, which faces the first abutment surface and by means of which the sliding arm is adapted to be brought into the housing interior during production of the clamp;

wherein a second housing part is fastened to the housing arrangement to close the opening;

wherein the opening in the housing interior is closed by the second housing part at a face opposite the second abutment surface except for a recess, through which the slide rail is passed;

wherein a holding element is arranged in the housing interior to hold the first bearing device, the second bearing device and the pressure piece; and wherein a roller holding element is arranged in the housing interior to hold rollers of the first bearing device;

said method comprising:

inserting the sliding arm into the first housing part from the opening.

54. The method according to claim 53, wherein after insertion of the sliding arm, the holding element is inserted into the first housing part.

55. The method according to claim 54, wherein the second housing part is placed on the first housing part after insertion of the holding element.

56. The method according to claim 54, wherein the second bearing device is fastened on the holding element before or after insertion of the holding element.

57. The method according to claim 53, wherein the roller holding element is inserted into the first housing part before insertion of the sliding arm.

58. The method according to claim 57, wherein the rollers of the first bearing device are held on at least one of the first housing part and the holding element by means of pins, which are inserted from an outside of the housing arrangement.

* * * * *

UNITED STATES PATENT AND TRADEMARK OFFICE

CERTIFICATE OF CORRECTION

PATENT NO. : 8,544,831 B2
APPLICATION NO. : 12/657492
DATED : October 1, 2013
INVENTOR(S) : Klein et al.

It is certified that error appears in the above-identified patent and that said Letters Patent is hereby corrected as shown below:

In the Claims

Column 22, lines 48-49: "holding element has a first recess pair of spaced recesses and a second recess pair of spaced recesses, in which the respec-" should read -- holding element has a first pair of spaced recesses and a second pair of spaced recesses, in which the respec- --

Signed and Sealed this
Twelfth Day of November, 2013

Teresa Stanek Rea
*Deputy Director of the United States Patent and Trademark Office*